United States Patent [19]

Stowe

[11] Patent Number: 5,459,804
[45] Date of Patent: Oct. 17, 1995

[54] FIBEROPTIC COUPLERS HAVING SPACER FIBERS THAT HAVE NO OPTICAL CORES

[75] Inventor: David W. Stowe, Milford, Mass.

[73] Assignee: Porta Systems Corporation, Syosset, N.Y.

[21] Appl. No.: 43,358

[22] Filed: Apr. 6, 1993

[51] Int. Cl.$^6$ ..................................................... G02B 6/26
[52] U.S. Cl. .............................. 385/42; 385/43; 385/46; 385/48; 385/114; 385/126
[58] Field of Search ............................. 385/39, 41, 42, 385/43, 114, 112, 115, 46, 51, 48, 126, 127

[56] References Cited

U.S. PATENT DOCUMENTS

| | | | |
|---|---|---|---|
| 3,554,721 | 1/1971 | Gardner | 350/96.24 |
| 3,579,316 | 5/1971 | Dycott et al. | 65/4 |
| 4,474,431 | 10/1984 | Bricheno | 350/96.15 |
| 4,586,784 | 5/1986 | Tremblay et al. | 350/96.15 |
| 4,632,513 | 12/1986 | Stowe et al. | 350/320 |
| 4,746,185 | 5/1988 | Shahidi-Hamedani | 350/96.15 |
| 4,798,436 | 1/1989 | Mortimore | 350/96.15 |
| 4,798,438 | 1/1989 | Moore et al. | 350/96.15 |
| 4,869,570 | 9/1989 | Yokohama et al. | 350/96.15 |
| 4,923,268 | 5/1990 | Xu | 350/96.15 |
| 4,986,620 | 1/1991 | Severijns et al. | 350/96.15 |
| 4,997,247 | 3/1991 | Stowe | 350/96.15 |
| 4,997,248 | 3/1991 | Stowe | 350/96.15 |
| 5,015,058 | 5/1991 | Thorncraft et al. | 385/42 |
| 5,121,452 | 6/1992 | Stowe et al. | 385/46 |
| 5,129,021 | 7/1992 | Mortimore et al. | 385/46 |
| 5,137,351 | 8/1992 | So | 356/73.1 |
| 5,148,509 | 9/1992 | Kannabiran | 385/109 |
| 5,166,994 | 11/1992 | Stowe et al. | 385/48 |
| 5,175,779 | 12/1992 | Mortimore | 385/43 |
| 5,175,782 | 12/1992 | Bowen et al. | 385/51 |
| 5,268,979 | 12/1993 | Weidman | 385/42 |

FOREIGN PATENT DOCUMENTS

| | | |
|---|---|---|
| 0013972 | 8/1980 | European Pat. Off. . |
| 0212954 | 3/1987 | European Pat. Off. . |
| 0293289 | 1/1988 | European Pat. Off. . |
| 54-35757 | 3/1979 | Japan . |
| 63-217314 | 9/1988 | Japan . |
| 87/00934 | 2/1987 | WIPO . |
| 87/05118 | 8/1987 | WIPO . |
| WO90/11540 | 10/1990 | WIPO . |

OTHER PUBLICATIONS

Snyder, Allan W., Journal of the Optical Society of America, "Coupled–Mode Theory for Optical Fibers", pp. 1267–1277, vol. 62, No. 11, Nov. 1972.

D. B. Mortimore et al., Electronics Letters, "Low–Loss Joints Between Dissimilar Fibres by Tapering Fusion Splices," pp. 318–319, vol. 22, No. 6, Mar. 13, 1986.

Mortimore, "Theory and Fabrication of 4X4 single–mode fused optical fiber coupler", Applied Optics, vol. 29, No. 3, pp. 371–374, Jan. 20, 1990.

Mortimore, "Wavelength–flattened fused couplers", Electronic Letters vol. 21, No. 17, Aug. 15, 1985.

Primary Examiner—Akm E. Ullah
Assistant Examiner—Hemang Sanghavi
Attorney, Agent, or Firm—Hoffmann & Baron

[57] ABSTRACT

The invention is a fiberoptic coupler formed by multiple optical fibers each having a core and a surrounding cladding and at least one spacer fiber having the refraction index substantially matched to the refraction index of the cladding of at least one adjacent optical fiber. The optical and spacer fibers are arranged, over a region extending axially through a limited length coupling region, in a side-by-side configuration wherein each fiber touches neighboring fibers. The coupling region is created by laterally fusing all fibers and is adapted to couple propagating modes of light between the optical fibers. Various configurations of the coupler include an arrangement of seven equal diameter fibers with a center fiber surrounded by six fibers, or an arrangement of nineteen equal diameter fibers with a center fiber surrounded by a first ring of six close-packed fibers and a second ring of twelve close-packed fibers. The number of the optical fibers and spacer fibers and their relative arrangements are selected to achieve desired properties of the coupler such as a number of optical input and output fibers, the coupling ratio or wavelength dependent coupling.

39 Claims, 5 Drawing Sheets

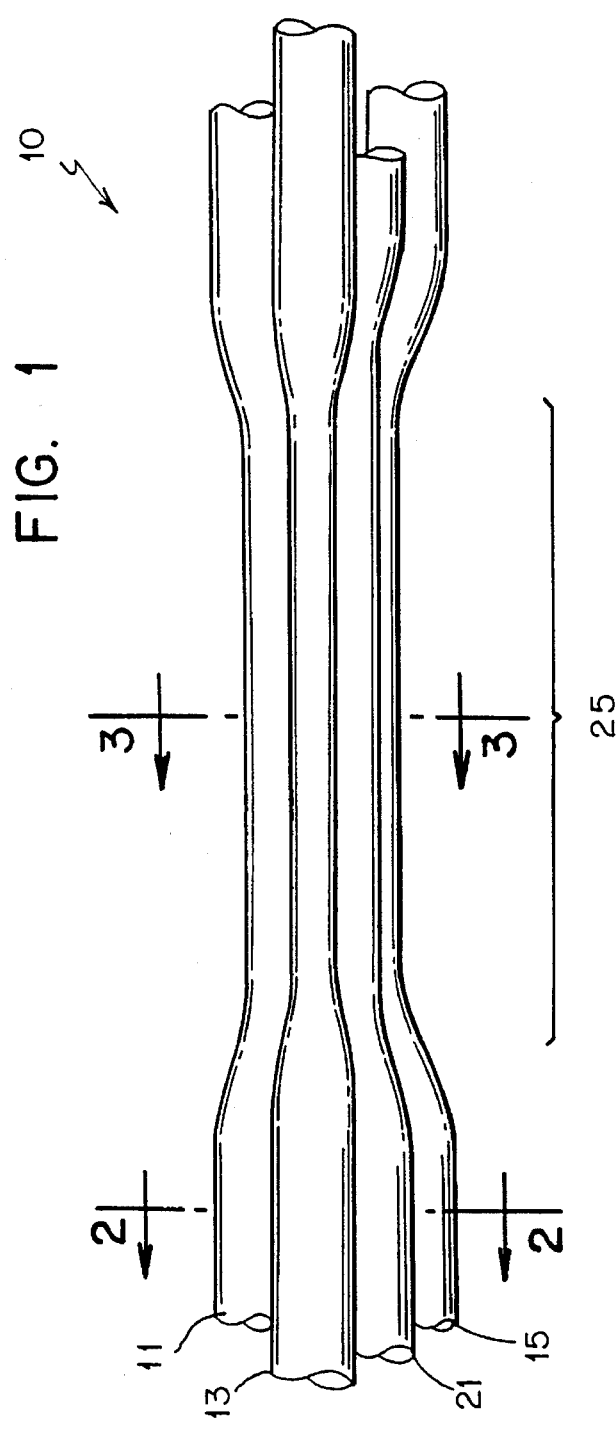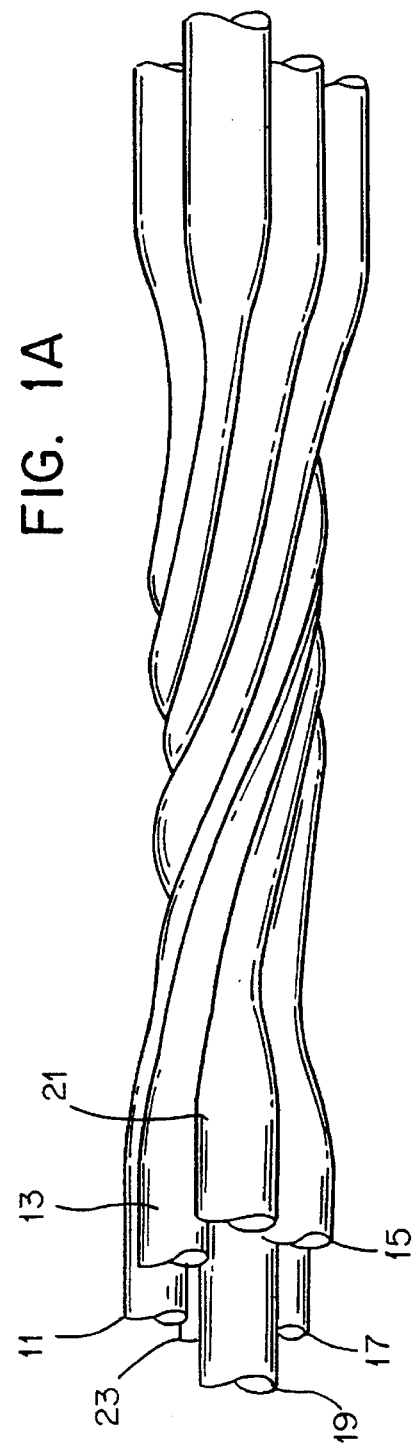

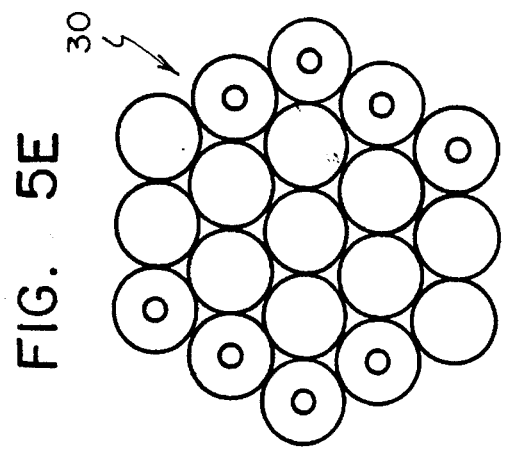
FIG. 5E
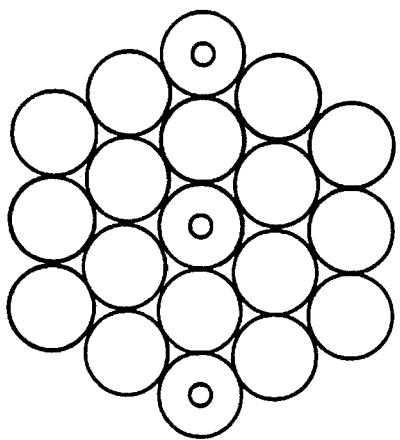
FIG. 5B
FIG. 5D
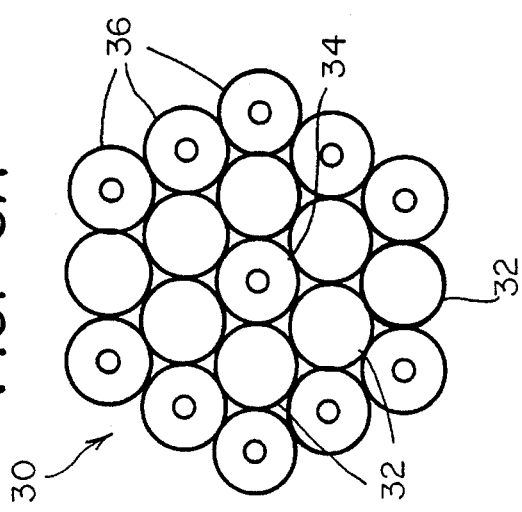
FIG. 5A
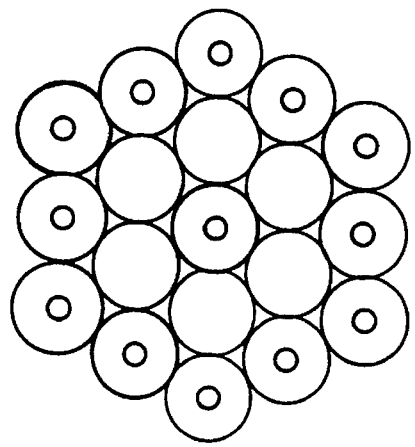
FIG. 5C

FIBEROPTIC COUPLERS HAVING SPACER FIBERS THAT HAVE NO OPTICAL CORES

CROSS REFERENCE TO RELATED APPLICATIONS

This patent application is related to U.S. Pat. No. 5,121,452, issued Jun. 9, 1992, entitled "Fiberoptic Powersplitter" and U.S. Pat. No. 5,166,994, issued Nov. 24, 1992, entitled "Low Cost 1×8 Single Mode Optical Fiber Coupler", both of which are incorporated by reference as if fully set forth herein.

BACKGROUND OF THE INVENTION

The invention relates to a multifiber fiberoptic coupler.

In general, fiberoptic couplers are created for the purpose of splitting the optical power in an optical fiber to two or more optical fibers or, conversely, to couple optical power present in two or more optical fibers into an optical fiber.

As described in earlier publications that are too numerous to be described individually, the fiberoptic couplers are made either by fusing or by bonding two or more optical fibers in a coupling region. The key to a successful coupler fabrication is a good control over the placement of the fibers brought into contact with each other in the coupling region prior to the fusion or bonding. For example, in the fusion process, imperfections such as insufficient contact between the fibers, dirt on the fiber surfaces, imbalances in tension forces applied to the fibers prior to the application of fusion heat, and three-dimensional non-uniformities in the applied heat could result in a low fabrication yield of couplers.

Fiberoptic couplers have been previously fabricated using two, three, or more bonded or fused optical fibers. The geometrical considerations attained in the coupling region substantially govern the coupling ratio between the individual optical fibers of the fiberoptic couplers; this is particularly true for couplers formed by identical optical fibers.

A simple known approach to fabricating a coupler is fusing two optical fibers to create a 2×2 coupler. If fiberoptic couplers of more than two optical fibers are needed, they are frequently fabricated by combining several 1×2 couplers in a tree or star like formation. However, this type of formation is not only fragile due to the vulnerability of the interconnecting fibers between the couplers but also bulky; this creates some difficulties in packaging.

Fused couplers have been made from seven identical optical fibers, wherein six fibers are arranged around a seventh inner fiber. In this geometry, the six outer optical fibers can be arrayed in perfect symmetry around an identical central optical fiber so that each of the surrounding fibers will contact both of its neighboring fibers and the central fiber in the same manner. Such perfect symmetry is not possible with other numbers of identical fibers.

Another prior approach to aligning and maintaining reliable contact among fibers prior to and during the fusion employs using a surrounding structure such as a tube made of an optical material. It is necessary to treat the surrounding tube on the optical fibers and the entire assembly is then heated and drawn in the fuse-drawing process. In some arrangements, it is difficult to maintain the threaded fibers precisely aligned prior and during the fusion process.

Couplers using less than seven identical optical fibers have been difficult to make since it is relatively difficult to obtain a periodic spacing and a uniform contact of the surrounding fibers. This is a disadvantage because many fiberoptic power distribution systems require equal power splitting in multiples of four optical fibers.

Thus, there is a need for a multifiber coupler design that is easy to fabricate, has a high fabrication yield and can accommodate a variable number of identical optical fibers with selected power distribution.

SUMMARY OF THE INVENTION

In one aspect, the invention features a multifiber fiberoptic coupler formed by a bundle of two or more optical fibers, and one or more spacer (or dummy) fibers. The optical fibers include a core and a surrounding cladding. The dummy fibers are made of optical material with the refraction index appropriately matched to the refraction index of the cladding and are adapted to maintain a proper position of the optical fibers. The spacer fibers do not contain a core and thus are not able to support a guided light mode, i.e., carry substantial amount of energy. The entire bundle of fibers is fused and drawn in a single location to form an integrated fused coupler. The spacer fibers are used for achieving a desired arrangement of the optical fiber; this enables formation of fiberoptic couplers with desired coupling ratio, improved uniformity and repeatable structure.

In one preferred embodiment, the optical fibers and the spacer fibers are all of the same size and cross-section, arranged and fused together in a side-by-side configuration about the central fiber. The resulting coupler can be easily made with a high yield and is very robust and environmentally rugged.

In another aspect, the invention features fiberoptic coupler comprising multiple optical fibers each having a core and a surrounding cladding, at least one spacer fiber having the refraction index substantially matched to the refraction index of the cladding of at least one adjacent optical fiber. The optical and spacer fibers are arranged, over a region extending axially through a limited length coupling region, in a side-by-side configuration wherein each fiber touches neighboring fibers. The coupling region is created by laterally fusing all the fibers and is adapted to couple propagating modes of light between the optical fibers.

Preferred embodiments of this aspect of the invention may include one or more of the following features.

The fiberoptic coupler is formed by a center spacer fiber surrounded by the optical fibers arranged in a close-packed configuration, wherein the diameter of the spacer fiber is selected to enable close packing of the neighboring optical fibers.

The configuration and the number of the fibers of the fiberoptic coupler is selected to achieve wavelength dependent coupling of modes between an input optical fiber and an output optical fiber.

The fiberoptic coupler is formed by seven equal diameter fibers with a center fiber surrounded by six fibers. The center fiber of the configuration may be an optical fiber and at least one of the six surrounding fibers is the spacer fiber. Alternatively, the center fiber may be a spacer fiber.

The fiberoptic coupler may be formed by six fibers surrounded by a second ring of twelve close-packed spacer fibers.

The fiberoptic coupler may be formed by a close-packed configuration of nineteen equal diameter fibers with a center fiber surrounded by a first ring of six close-packed fibers and a second ring of twelve close-packed fibers. The center fiber may be an optical fiber and at least one of the eighteen surrounding fibers is a spacer fiber. Alternatively, the center fiber may be a spacer fiber.

The coupling region is formed by a fuse-drawing process and its length may be designed to achieve a selected coupling ratio.

The geometry of the optical fibers configuration may be selected to achieve a desired coupling ratio between the optical fibers.

The fiberoptic coupler may be formed by fibers arranged linearly side-by-side to form a ribbon like structure with each fiber touching its neighboring fibers. In the ribbon like structure, the geometry of the fiber configuration and the number of the fibers may be selected to achieve wavelength dependent coupling of modes between an input optical fiber and an output optical fiber.

In another aspect, the invention features a 1×4 symmetric fiberoptic coupler comprising five equal diameter optical fibers each having a core and a surrounding cladding and two spacer fibers having the refraction index substantially matched to the refraction index of the cladding of the optical fibers. One of the optical fibers is located in the center and other four optical fibers and the two spacer fibers are located substantially symmetrically as a ring of six fibers around the central optical fiber forming a close-packed configuration. The fibers are extended axially through a limited length coupling region, created by a fuse-drawing process, and are adapted to couple propagating modes of light between the optical fibers.

In another aspect, the invention features a 1×8 symmetric fiberoptic coupler comprising nine equal diameter optical fibers each having a core and a surrounding cladding and ten spacer fibers having the refraction index substantially matched to the refraction index of the cladding of the optical fibers. One optical fiber is located in the center and is surrounded by a ring of six spacer fibers. A second ring of twelve fibers formed by eight optical fibers and two spacer fibers is located substantially symmetrically around the central optical fiber to form a close-packed configuration. The fibers extend axially through a limited length coupling region, created by a fuse-drawing process, and are adapted to couple propagating modes of light between the optical fibers.

In another aspect the invention features a fiberoptic coupler comprising multiple optical fibers each having a core and a surrounding cladding and multiple spacer fibers having the refraction index substantially matched to the refraction index of the cladding of at least one adjacent optical fiber. The optical fibers are arranged in groups of two or more fibers located in close proximity and separated by at least one spacer fiber. All fibers are placed side-by-side and extend axially through a limited length coupling region. The coupling region is created by laterally fusing the fibers and is adapted to couple propagating modes of light between the optical fibers in each the group. The spacer fibers are adapted to substantially eliminate coupling of modes of light between different groups of fibers.

The various fiberoptic couplers may use single mode optical fibers or multimode optical fibers.

In another aspect, the invention features a multicoupler unit that includes a bundle of two or more side-by-side pairs of optical fibers isolated by at least one spacer fiber and a large separator fiber of appropriately matched index of refraction to separate the optical fibers from each other. This bundle is fused and drawn in a single location to form an integrated rigid structure in which each pair of adjacent optical fibers forms a fused biconical coupler having respective optical fiber leads. The individual couplers are optically "insulated" from each other by the mass of transparent optical material provided by the separator fibers. This embodiment allows a multiplicity of optical couplers to be intercoupled in a smaller junction where fewer housings are required.

BRIEF DESCRIPTION OF THE DRAWING

FIG. 1 is a side view of a symmetrical coupler formed by a fuse drawing process of seven optical or spacer fibers of an identical diameter arranged in a close-packed configuration in accordance with the present invention.

FIG. 1A is a side view of the coupler of FIG. 1 formed by twisting the fiber configuration.

FIGS. 5A through 5D are cross-sectional views of various embodiments of 1×N or M×N the fiberoptic coupler of FIG. 5.

FIG. 5E is a cross-sectional view of an 8×8 embodiment of the fiberoptic coupler of FIG. 5.

DESCRIPTION OF THE PREFERRED EMBODIMENTS

Figure 2:
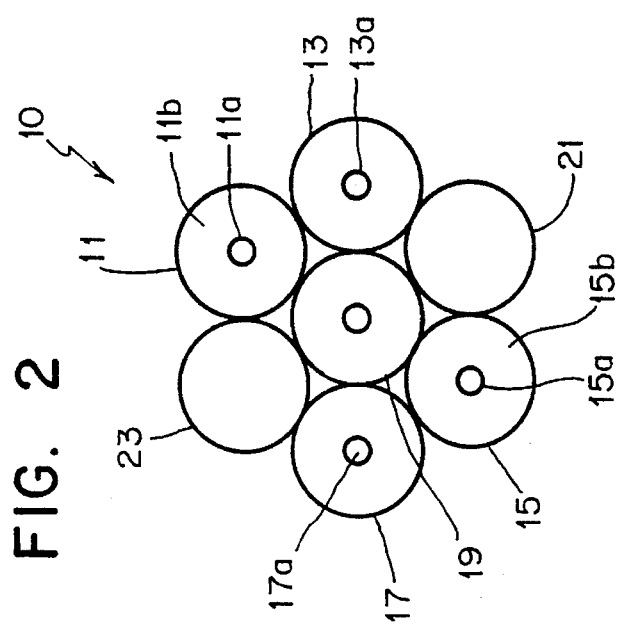
FIG. 2 is a cross-sectional view of the coupler of FIG. 1 in the 2—2 direction.

FIG. 1 is a side view and FIG. 2 a cross-sectional view of a symmetrical bundle 10 formed by optical fibers 11, 13, 15, 17, and 19 and spacer fibers 21, and 23 positioned in a close-packed hexagonal arrangement, before fusion. Each optical fiber (single mode, multimode fiber, etc.) includes a core (labeled 11a, 13a, 15a, 17a, and 19a) and a cladding (labeled 11b, 13b, 15b, 17b, and 19b). Spacer (or "dummy") fibers 21 and 23 are fabricated from optically pure material with a refractive index matched to the refractive index of the cladding of the neighboring optical fibers. Since the spacer fibers do not have a core, they are unable to support propagation of a guided light mode; this substantially eliminates losses through the spacer fiber. Bundle 10 is formed by the uniform hexagonal structure of the same diameter fibers, wherein a central fiber is surrounded by a ring of fibers each having contact with the central fiber and neighboring films. Such configuration is mechanically stable and readily amenable to fusion and drawing.

Figure 3:
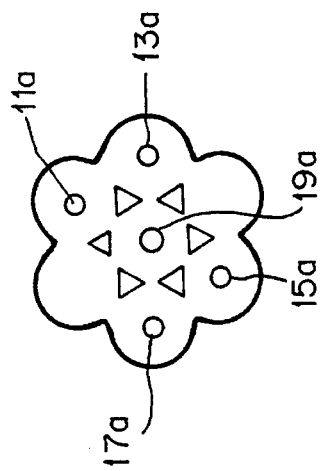
FIG. 3 is a cross-sectional view of the fiberoptic coupler of FIG. 1 in the 3—3 direction.

Bundle 10 is fused and drawn to form a tapered coupling region 25 shown in a cross-sectional view in Fig. 3. Prior to the fusion process, the fiber coating is removed in and around coupling region 25 of each optical fiber, and the individual fibers are arranged and aligned side-by-side. Then, bundle 10 is mounted into clamps of two translation stages. A heat source of an appropriate shape (e.g., a torch, a resistance heated wire, a laser) is applied over a relatively narrow region of bundle 10 until a suitable working temperature is obtained. Subsequently, one or both translation stages are activated to elongate the heated region of bundle 10 by performing unidirectional or bi-directional drawing. While the fusing is performed, light is launched into one of the optical fibers at the input side of the coupler and detected at another optical fiber at the output side of the coupler. The drawing is continued until the amount of light coupled between the fibers reaches a predetermined relationship. To create a radial force that facilitates a good coupling of the fibers, bundle 10 may be twisted prior to or during the fusion, as shown in FIG. 1A. Depending on the type of the coupler or the desired coupling ratio, the coupling region may have a fractional turn or several turns.

After the fuse-drawing process, the diameter of the coupling region is less than one fourth of the original size. The fused portion of the resulting coupler is several millimeters to few centimeters long depending on the coupling ratio and degree of fusion. In the cross-section of the fused coupling region (FIG. 3) cores 11a, 13a, 15a, 17a, and 19a of the respective optical fibers are situated in sufficiently close positions so that a desired optical coupling of propagating light modes occurs. The coupling depends on the distances between the fiber cores, as known in the art.

Following the drawing process, the fibers extending from the coupling region are bonded on a rigid, slotted cylindrical substrate using an adhesive. The coupling region is suspended in air above the slotted area on the substrate. The bonds are designed to isolate and relieve the strain on the coupling region from external forces. This structure is then enclosed in a polymer tube and an adhesive sealant is used at the end of the polymer tube to protect the coupler. For the final protection, the entire structure may be encapsulated in a stainless steel tube.

Figure 4C:
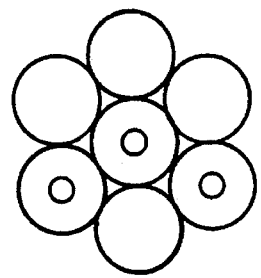
FIGS. 4A through 4G are cross-sectional views of various 1×N or M×N embodiments of the fiberoptic coupler of FIG. 1.
Figure 4B:
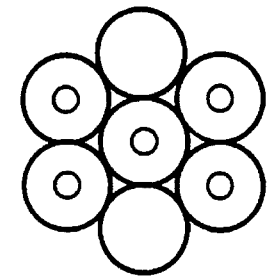
Figure 4A:
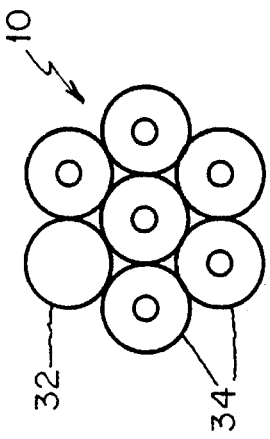

Different embodiments of the multifiber coupler, formed by the spacer fibers 32 and the optical fibers 34, are shown in cross-sectional views in FIGS. 4A through 4I, The coupler arrangement of FIG. 4A may be used as a 1×6 or 1×5 coupler and, similarly, the coupler arrangement of FIG. 4B may be used as a 1×5 or 1×4 coupler depending on the use, the desired coupling ratio, and whether the central input fiber is also utilized as an output fiber. In many applications wherein light of several wavelengths (e.g., 1300 nm and 1550 nm) is multiplexed for simultaneous transmission and distribution, it is important to fabricate couplers that have a wavelength independent coupling ratio. To obtain the wavelength independent coupling ratio, the coupler is drawn in the fusion process to an extreme wherein 100% of the input light is distributed to the surrounding optical fibers. Alternatively, light carried by several optical fibers, each may have a different wavelength or modulation frequency, is combined in the coupler and carried out in the centrally located output fiber.

FIG. 4B shows an important 1×4 embodiment of the present invention. The central input, optical fiber is symmetrically arranged with respect to the output fibers so that each of the output fibers carries substantially equal amount of light. The symmetry of the optical fibers, their locations with respect to each other and the extent of the fuse-drawing govern the coupling ratio. The spacer fibers, which in general can have different sizes and refraction indexes, enable proper positioning of the optical fibers and easy manipulation of the fiber bundle.

Figure 4D:
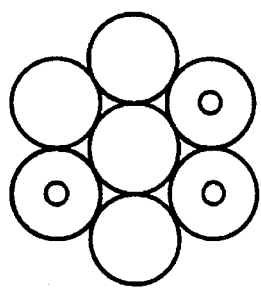
Figure 4E:
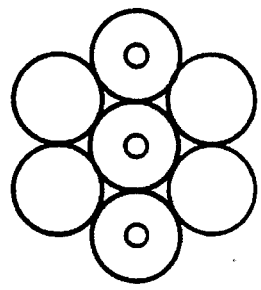
Figure 4F:
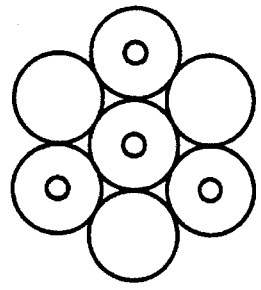

By achieving desired symmetrical or asymmetrical locations of the fiberoptic cores in the coupling region, standardized couplers with desired coupling ratios are fabricated. For example, for a fiberoptic coupler that exhibits a wavelength dependent coupling ratio, it is advantageous to form the coupling region with linearly arranged optical fibers, as shown in FIGS. 4E, 4G, or 5D. The spacer fibers maintain the desired distance of the fiber cores and thus the coupling ratio. Furthermore, the spacer fibers complete the close packed structure that is easy to handle during the coupler fabrication.

Figure 4I:
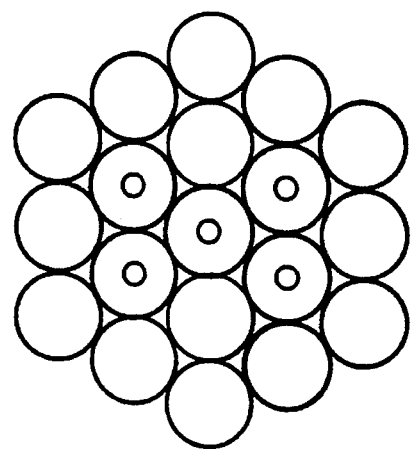
FIG. 4I is a cross-sectional view of the 1×4 fiberoptic coupler of FIG. 4B also including a second level of twelve close-packed spacer fibers.

Referring to FIG. 4I, in another embodiment, a separate protection layer around the coupling region of the coupler of FIG. 4B is created by surrounding bundle 10 with twelve spacer fibers prior to the fusion process. In the fuse-drawing process, the spacer fibers form a glass barrier, i.e., an extending cladding, that protects the coupling region and reduces the effects of the external environment.

Figure 4H:
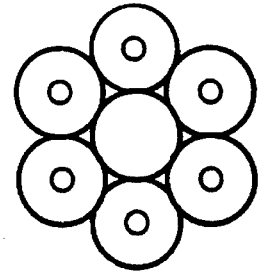
FIG. 4H is a cross-sectional view of a 6×6 embodiment of the fiberoptic coupler of FIG. 1.
Figure 4G:
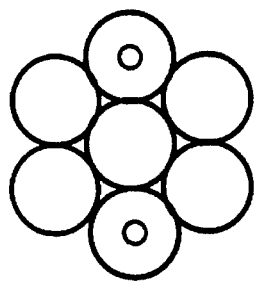

Referring to FIG. 4H, in another embodiment the multifiber coupler is a 6×6 symmetrical coupler formed by six optical fibers that surround a central spacer fiber. The equal diameter spacer fiber enables a easy positioning and symmetric packing of the optical fibers. A coupler with a different number of similarly packed N×N fibers is fabricated using a central spacer fiber of a different diameter. The diameter sizes are described in Table 1 of the U.S. Pat. No. 5,121,452 patent. For example, a symmetrical 5×5 coupler has a central spacer fiber with a diameter reduced by a factor of 1.43.

Figure 5:
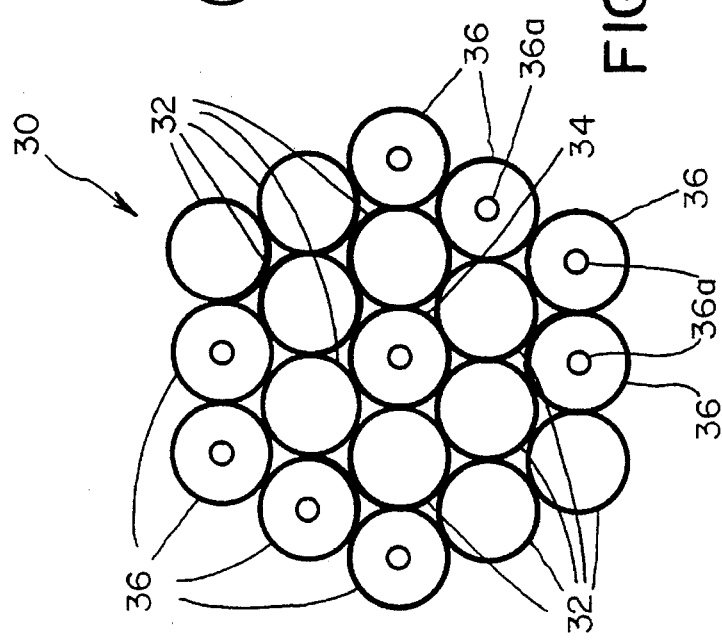
FIG. 5 is a cross-sectional view of a symmetrical nineteen fiber fiberoptic coupler with optical fibers and spacer fibers arranged in a close-packed configuration in accordance with the present invention.

Referring to FIG. 5, in another embodiment, the multifiber coupler features a 1×8 coupler arranged in a bundle 30. To achieve a substantially symmetrical arrangement and the close packing of the optical fibers, six spacer fibers 32 surround a centrally located optical input fiber 34. Optical output fibers 36 are located in a second ring (cylindrical layer) around the input fiber. As described above for the coupler of FIG. 1, bundle 30 is fused and drawn to form a tapered coupling region. The length of the coupling region correspond to a desired coupling ratio.

Different embodiments of the nineteen fiber coupler of FIG. 5 are shown in FIGS. 5A through 5E. The arrangement of spacer fibers 32 and optical fibers 34 and 36 is selected depending on the desired properties of the coupler. Referring to FIG. 5E, the nineteen fiber close-packed configuration is also used to fabricate a 8×8 coupler. In the 8×8 coupler, the central optical fiber is replaced by a spacer fiber of the same diameter, and the optical fibers of the second layer are used as both input and output fibers. Couplers that include a larger number of optical fibers (e.g., 9×9, 10×10, etc.) are within the scope of the present invention.

Figure 6C:
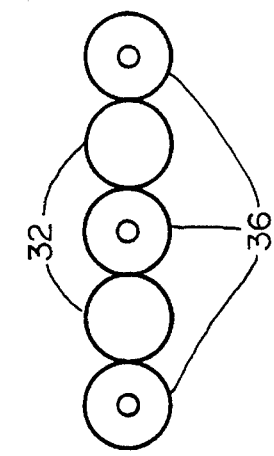
FIGS. 6A through 6C are cross-sectional views of linear fiberoptic couplers in accordance with the present invention.
Figure 6B:
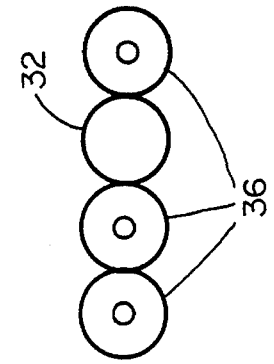
Figure 6A:
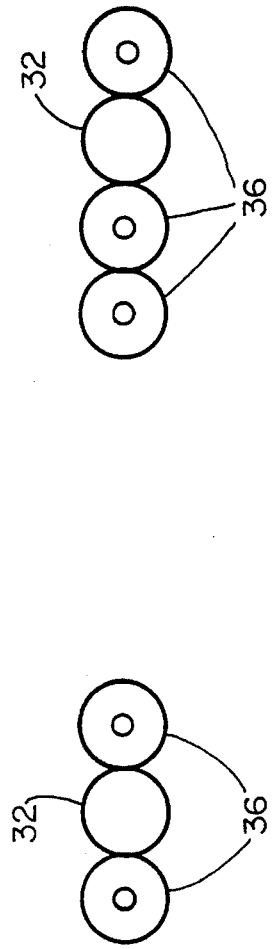

Referring to FIGS. 6A through 6C, in another embodiment optical fibers 36 and spacer fibers 32 are arranged linearly side-by-side to form a ribbon like structure. The multifiber coupler is again formed by fuse-drawing, as described above. The ribbon like structure may be twisted in the fusion process to provide improved coupling between the fibers. Since the coupling ratio at different wavelengths depends on the distance between the fiber cores, a desired wavelength dependent coupling ratio can be achieved by selecting a spacer fiber with a proper diameter or a suitable number of spacer fibers separating the optical fibers. This arrangement may be used to fabricate a wavelength dependent multiplexer (WDM).

Figure 7B:
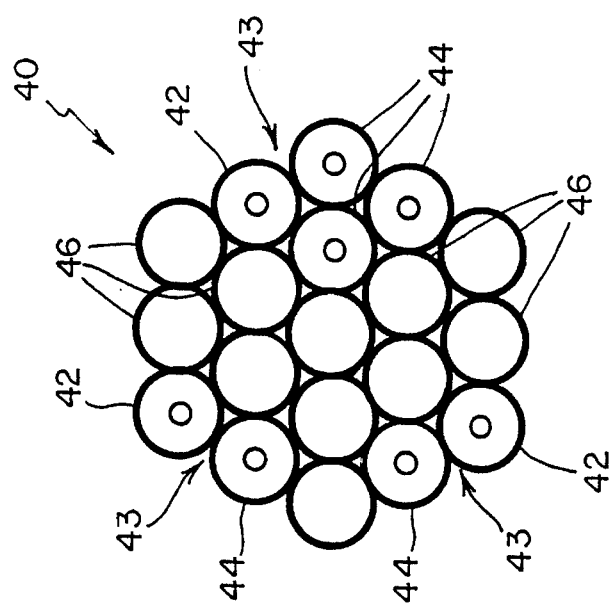
FIGS. 7A through 7B are cross-sectional views of several fiberoptic couplers separated by at least one spacer fiber, all integrated into one fiberoptic coupler structure.
Figure 7A:
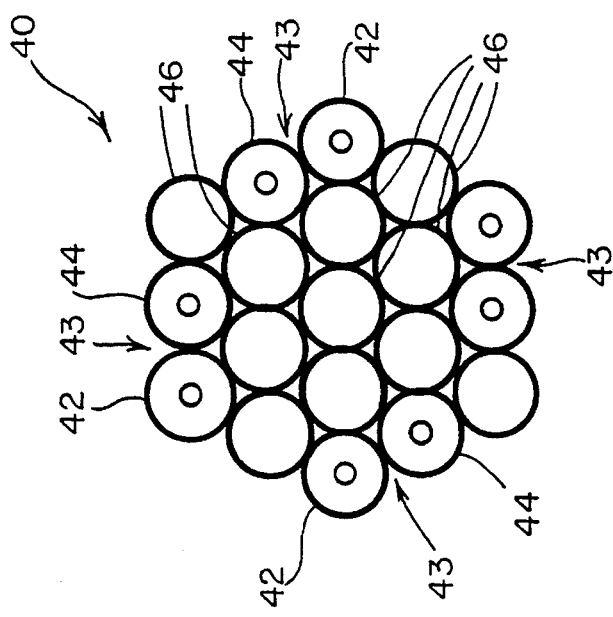

Referring to FIGS. 7A and 7B, the use of spacer fibers enables fabrication of several fiberoptic couplers integrated into one rigid structure 40. Optical input fibers 42 and output fibers 44 are arranged side-by side to form a coupler 43. The individual couplers are separated by one or more spacer fibers 46 depending on the needed separation. The individual couplers are optically "insulated" from each other by the mass of transparent optical material provided by the spacer fibers. Fiber bundle 40 is fuse-drawn in a single location to form an integrated rigid structure. This embodiment allows close packing of several optical couplers, each having a selected geometry and coupling ratio.

It is within the scope of this invention to use spacer fibers of different sizes and shapes made of substantially homogeneous optical material. A tubular fiber may be also used as the spacer that maintains a desired distance between the fibers. In a fiberoptic structure that includes several fiberoptic couplers (FIGS. 7A through 7C), the tubular spacer fiber also creates air cladding for the coupling region.

In another embodiment, the coupling region of the described couplers is formed by a bonding process. The bonding is achieved using a 5 minute epoxy, UV epoxy or other suitable adhesives. Before or after the bonding material is applied, the fiber bundle may be tied together to exert an external radial force on the fibers. It is within the scope of the present invention to use etched or unetched optical fibers.

Other embodiments are within the scope of the following claims:

I claim:

1. A fiberoptic coupler comprising a central spacer fiber that has no optical core, multiple surrounding fibers at least two of which being optical fibers that have optical cores and surrounding cladding, said multiple fibers being arranged, over a region extending axially through a limited length coupling region, in a close-packed ring of fibers that surrounds said central spacer fiber wherein said multiple and central fibers touch neighboring fibers, and said coupling region comprising a fused region in which all of said surrounding fibers and said central fiber, in their respective regions of contact, are fused together forming a unitary structure adapted to couple propagating modes of light between said optical fibers.

2. The fiberoptic coupler of claim 1 wherein said central spacer fiber has a refractive index substantially matched to the refractive index of the cladding of at least one of said at least two optical fibers.

3. The fiberoptic coupler of claim 1 wherein the distance separating the constituent optical fibers is selected to achieve wavelength-dependent coupling of modes between the constituent optical fibers.

4. The fiberoptic coupler of claim 1 wherein said multiple surrounding fibers are of substantially equal diameter.

5. The fiberoptic coupler of claim 4 wherein said central fiber has a diameter substantially equal to the diameter of said multiple surrounding fibers.

6. The fiberoptic coupler of claim 4 wherein six of said multiple surrounding fibers form a close-packed ring around said central spacer fiber.

7. The fiberoptic coupler of claim 1 wherein said close-packed ring of fibers is surrounded by a second ring of close-packed spacer fibers.

8. The fiberoptic coupler of claim 1 wherein the constituent optical fibers of said coupler are arranged to form at least two substantially optically segregated couplers each comprising at least two optical fibers, said at least two substantially segregated couplers being separated by one or more spacer fibers.

9. A fiberoptic coupler comprising a central fiber, and at least two concentric rings of multiple surrounding fibers at least two of which being optical fibers that have optical cores and surrounding cladding, at least one of said central and multiple surrounding fibers being a spacer fiber that has no optical core, said multiple fibers being arranged, over a region extending axially through a limited length coupling region, in a close-packed ring of fibers that surrounds said central fiber wherein said central and multiple surrounding fiber touch neighboring fibers, said multiple surrounding fibers comprising an inner ring of fibers that surrounds said central fiber in a close-packed configuration wherein each of said fibers in said inner ring touches neighboring surrounding fibers and said central fiber, and a second ring of fibers surrounding said inner ring of fibers, said coupling region comprising a fused region in which said multiple surrounding fibers and said central fiber, in their respective regions of contact, are fused together forming a unitary structure adapted to couple propagating modes of light between said optical fibers.

10. The fiberoptic coupler of claim 9 wherein said multiple surrounding and central fibers comprise nineteen substantially equal diameter fibers with said central fiber surrounded by an inner close-packed ring of six of said multiple surrounding fibers and a second close-packed ring of twelve of said multiple surrounding fibers.

11. The fiberoptic coupler of claim 9 wherein said central fiber is an optical fiber and at least one of said multiple surrounding fibers is a spacer fiber having no optical core.

12. The fiberoptic coupler of claim 9 wherein said central fiber is a spacer fiber having no optical core.

13. The fiberoptic coupler of claim 1 or 9 wherein said coupling region is formed by a fuse-drawing process.

14. The fiberoptic coupler of claim 1 or 9 wherein the length of said coupling region is selected to achieve a desired coupling ratio between the constituent optical fibers.

15. The fiberoptic coupler of claim 1 or 9 wherein at least one constituent spacer fiber comprises a solid cylindrical fiber made of substantially homogeneous optical material.

16. The fiberoptic coupler of claim 9 wherein said second ring comprises a close-packed ring of spacer fibers.

17. A 1×4 fiberoptic coupler comprising seven substantially equal diameter fiber elements in close-packed arrangement, said seven fiber elements comprising five substantially equal diameter optical fibers each having an optical core and a surrounding cladding, and two spacer fibers, each having no optical core;

one of said optical fibers being a central fiber and the other four of said five optical fibers and said two spacer fibers forming a close-packed ring of fibers surrounding said central fiber in a limited length coupling region, wherein the constituent fibers in the six fiber ring are arranged in the following fiber sequence: a group of two adjacent optical fibers, a spacer fiber, a second group of two adjacent optical fibers, and a second spacer fiber, wherein the constituent fibers of said ring touch neighboring fibers and said central fiber, and said coupling region is created by a fuse-drawing process in which the fibers of said ring and said central fiber are fused together in their respective regions of contact forming a unitary structure adapted to couple propagating modes of light between said optical fibers.

18. The 1×4 fiberoptic coupler of claim 17 wherein each of said two spacer fibers has a refractive index substantially matched to the refractive index of the cladding of each of said five optical fibers.

19. A 1×8 symmetric fiberoptic coupler comprising
   a central fiber, and at least two concentric rings of multiple surrounding fibers comprising
   nine equal diameter optical fibers each having an optical core and a surrounding cladding,
   ten spacer fibers, each having no optical core, and each having a refractive index substantially matched to the refractive index of the cladding of said optical fibers,
   one of said optical fibers located in the center surrounded by an inner, close-packed ring of six of said ten spacer fibers and a second ring of twelve fibers formed by the remaining eight of said nine optical fibers and the remaining two of said ten spacer fibers located substantially symmetrically around said central optical fiber forming a close-packed arrangement, and
   said fibers extending axially through a limited length coupling region, created by a fuse-drawing process in which the constituent optical and spacer fibers are fused together in their respective regions of contact forming a unitary structure adapted to couple propagating modes of light between said optical fibers.

20. A fiberoptic coupler comprising:
   multiple optical fibers each having an optical core and a surrounding cladding,
   multiple spacer fibers, each having no optical core, and each having a refractive index substantially matched to the refractive index of the cladding of at least one of said multiple optical fibers,
   said optical fibers arranged in substantially optically segregated groups of two or more adjacent optical fibers said groups being separated by at least one spacer fiber, wherein the constituent fibers of said coupler are arranged side-by-side and extend axially through a limited length coupling region, and
   said coupling region being created by laterally fusing together the constituent optical and spacer fibers in their respective regions of contact forming a unitary coupler adapted to couple propagating modes of light between the optical fibers within each of said groups, said spacer fibers being adapted to substantially eliminate coupling of modes of light between the different groups of fibers.

21. The fiberoptic coupler of claim 17, 19 or 20 wherein said coupling region is drawn to a length that achieves a selected coupling ratio.

22. The fiberoptic coupler of claim 1, 2, 3, 4, 10, 17, 19 or 20 wherein said optical fibers are single-mode optical fibers.

23. The fiberoptic coupler of claim 1, 2, 3, 4, 10, 17, 19 or 20 wherein said optical fibers are multi-mode optical fibers.

24. A method of fabricating a fiberoptic coupler comprising the steps of:
   (a) providing a multiple surrounding fibers at least two of which being optical fibers that have optical cores and surrounding cladding,
   (b) providing a central spacer fiber, having no optical core,
   (c) arranging said multiple surrounding fibers over a region extending axially through a limited length coupling region, in a close-packed ring of fibers that surrounds said central spacer fiber wherein said multiple surrounding and central fiber touch neighboring fibers, and
   (d) fusing together said multiple surrounding and central fibers in their respective regions of contact, in said limited length coupling region to form a unitary structure having a desired coupling ratio between the constituent optical fibers.

25. The method of claim 24 wherein said central fiber that is provided has a refractive index substantially matched to the refractive index of the cladding of at least one of said at least two optical fibers.

26. The method of claim 24 wherein said step of arranging said multiple surrounding fibers comprises arranging the constituent fibers to achieve a desired distance separating the constituent optical fibers in a manner to achieve wavelength-dependent coupling of modes between the constituent.

27. The method of claim 24 wherein said multiple surrounding fibers that are provided are of substantially equal diameter.

28. The method of claim 27 wherein said central fiber that is provided has a diameter substantially equal to the diameter of said multiple surrounding fibers.

29. The method of claim 24 wherein said step of arranging comprises arranging six of said multiple surrounding fibers around said central spacer fiber in a close-packed ring.

30. The method of claim 24 wherein the step of arranging said multiple surrounding fibers comprises
   arranging six of said multiple surrounding fibers in an inner close-packed ring of fibers wherein each of said fibers in said inner ring touches neighboring surrounding fibers and said central fiber, and
   arranging a second close-packed ring of fibers around said inner ring of fibers.

31. The method of claim 24 wherein the step of arranging said multiple surrounding fibers comprises arranging nineteen substantially equal diameter fibers so that said central spacer fiber is surrounded by a first ring of six close-packed fibers that is in turn surrounded by a second ring of twelve close-packed fibers.

32. The method of claim 31 wherein at least one of the eighteen surrounding fibers that are provided is a spacer fiber that has no optical core.

33. The method of claim 24 wherein the diameter of said central spacer fiber is selected to enable close-packing of said multiple surrounding fibers.

34. The method of claim 24 or 33 wherein the step of fusing is performed by fuse-drawing to form a tapered laterally fused coupling region.

35. The method of claim 24 or 33 wherein said optical fibers are single-mode optical fibers.

36. The method of claim 24 or 33 wherein said optical fibers are multi-mode optical fibers.

37. A fiberoptic coupler comprising
   an inner axially elongated spacer fiber having no optical core, and
   first and second axially elongated optical fibers each having an optical core and a surrounding cladding,
   said optical and spacer fibers being arranged linearly side-by-side in a coupling plane with said spacer fiber separating and touching said first and second optical fibers in a limited length coupling region lying in said coupling plane, said coupling region comprising a fused region in which said optical and spacer fibers, in their respective regions of contact, are fused together in said coupling plane forming a unitary planar, ribbon-like structure of single fiber thickness, wherein the transverse distance separating the optical cores of the optical fibers is selected to achieve a desired wavelength-dependent coupling ratio between the constituent optical fibers of said coupler.

38. A method of fabricating a fiberoptic coupler comprising the steps of:

(a) providing a central fiber;

(b) providing multiple surrounding fibers at least two of which being optical fibers each having an optical core and a surrounding cladding, at least one of said central and multiple surrounding fibers being a spacer fiber without an optical core;

(c) arranging said multiple fibers, over a region extending axially through a limited length coupling region, in a close-packed ring of fibers surrounding said central fiber wherein said central and multiple surrounding fiber touch neighboring fibers, wherein arranging said ring of multiple surrounding fibers comprises surrounding said central fiber with an inner ring of said multiple surrounding fibers in a close-packed configuration wherein each of said fibers in said inner ring touches neighboring surrounding fibers and said central fiber, and surrounding said inner ring of fibers with a second ring of fibers; and (d) fusing together, in said coupling region, said multiple surrounding and said central fibers in their respective regions of contact thereby forming a unitary structure adapted to couple propagating modes of light between the constituent optical fibers.

39. A method for forming a 1×4 fiberoptic coupler comprising the steps of:

(a) providing seven substantially equal diameter fiber elements in close-packed arrangement, said seven fiber elements comprising five substantially equal diameter optical fibers each having an optical core and a surrounding cladding, and two spacer fibers each without an optical core;

(c) arranging four of said five optical fibers and said two spacer fibers in a close-packed ring around a central fiber consisting of the remaining one of said five optical fibers in the following sequence: a group of two adjacent optical fibers, a spacer fiber, a second group of two adjacent optical fibers, and a second spacer fiber, wherein each of the fibers in said close-packed ring touch neighboring fibers in the ring and said central optical fiber; and (d) fusing together, in said coupling region, the fibers in said ring and said central fiber in their respective regions of contact thereby forming a unitary structure adapted to couple propagating modes of light between the constituent optical fibers.

* * * * *